A. A. WARNER.
CHURN.
APPLICATION FILED MAY 13, 1913.

1,177,977.

Patented Apr. 4, 1916.

WITNESSES

INVENTOR
Alonzo A. Warner
BY
his ATTORNEY

UNITED STATES PATENT OFFICE.

ALONZO A. WARNER, OF NEW BRITAIN, CONNECTICUT, ASSIGNOR TO LANDERS. FRARY & CLARK, OF NEW BRITAIN, CONNECTICUT, A CORPORATION OF CONNECTICUT.

CHURN.

1,177,977.  Specification of Letters Patent.  Patented Apr. 4, 1916.

Application filed May 13, 1913. Serial No. 767.359.

*To all whom it may concern:*

Be it known that I, ALONZO A. WARNER, a citizen of the United States, and a resident of New Britain, in the county of Hartford and State of Connecticut, have invented certain new and useful Improvements in Churns, of which the following is a specification.

The object of this invention is to produce a device of the character described having features of novelty and advantage.

Figure 1:
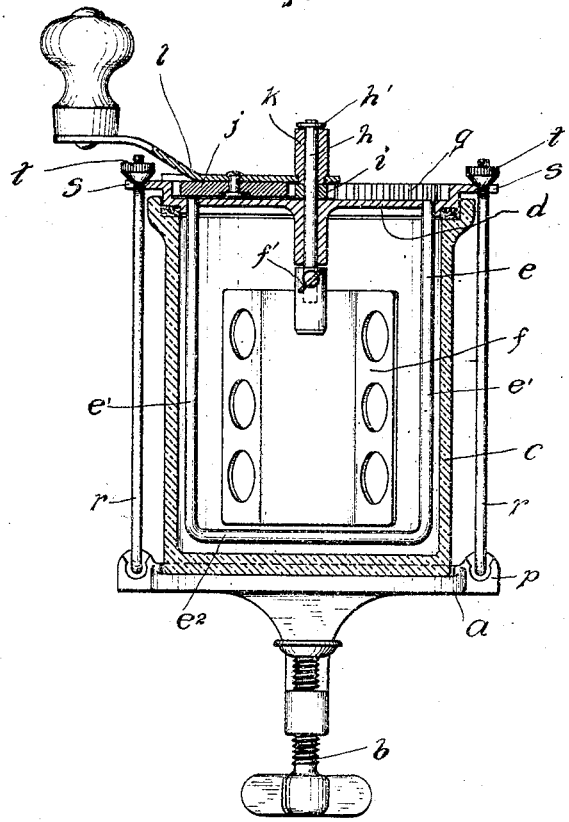
Figure 2:
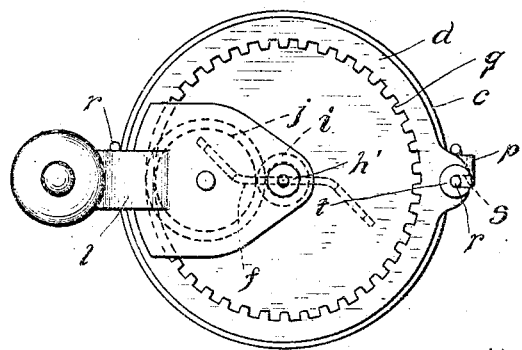

In the embodiment of the invention illustrated in the drawings Figure 1 is a side view partly in section. Fig. 2 is a top view thereof.

Referring to the drawings, $a$ denotes a base preferably of metal, having underneath it a screw clamp $b$, by means of which it may be attached to the edge of the table to hold the churn securely while it is in use; $c$ is the jar supported by the base and within which the churning action takes place. It has smooth, uninterrupted side and bottom walls.

$d$ is the cover fitting onto the top of the jar, having secured to its underside a retarder $e$ in the form of a depending U-shaped strap, the side arms $e'$ $e'$ of which are spaced a little distance from the wall of the jar, and the connecting bar $e^2$ at a little distance from the bottom of the jar. In the upper face of the cover is cut an internal gear $g$, and extending through the cover centrally is a shaft $h$ upon which a pinion $i$ is mounted which is connected with the internal gear by the intermediate gear $j$. The bearing $k$ for the shaft is mounted upon the handle $l$, and the intermediate gear $j$ is mounted on a stud secured to the handle $l$.
This part of the handle is in the form of a plate which overlies the meshing point of the gears to a greater or less extent as may be desired to avoid accidents. A washer $h'$ secured to the upper end of the shaft above its bearing holds the shaft and its pinion on the handle so that the handle with the bearing, shaft, and the two gears, can be removed as a unit. The shaft extends through the cover and has secured to its lower end the plate $f$ which is fastened by a thumb screw $f'$. By the operation of this single fastening means the operative parts of the churn mechanism may be assembled ready to be positioned in the jar.
Pivoted in lugs $p$ at opposite sides of the base are the tie rods $r$, $r$, which are adapted to enter notches $s$, $s$, in the cover, and are provided with thumb nuts $t$, $t$, by means of which the cover is clamped onto the jar, and the jar onto the base, securely tying the parts of the complete structure together.

I have already made mention of the fact that the interior walls of the jar are quite smooth, making it possible to thoroughly cleanse the jar after use. The churning mechanism is all carried by the cover and may be removed from the jar as an assembled unit, and then by unfastening a single thumb screw it can be dis-assembled for thorough cleansing of its parts. The retarder prevents the whirling of the cream with the blade, and the apertured marginal edges of the blade in conjunction with the retarder produce the kind of agitation necessary in a successful and quick-acting device of this character. The shape of the blade is such that the cream is kept moving in a most effective manner. As it moves laterally on the center of the blade under the centrifugal action, it is caught by the angularly disposed edges and its direction and rate of motion abruptly changed.

Another feature worthy of note is that the operative mechanism is all located in a horizontal plane and is comprised of few parts and simple construction, and the operating handle moves in a horizontal plane. The interposed gear is guarded at its meshing point with the pinion and internal gear by the handle plate, in order that the fingers of the operator may not be caught in the gears.

The complete structure is extremely efficient, and yet simple in its construction and assembling and it is particularly adapted for manufacture in smaller sizes for home use and to handle small quantities of cream.

I claim as my invention:—

1. In a device of the character described, a jar, a cover therefor, a shaft extending through the cover, a blade mounted on the shaft, an operating handle located above the cover, a bearing for said shaft mounted on said handle, and gear connections for said shaft operated by said handle.

2. In a device of the character described, a jar, a cover therefor, a shaft extending through the cover, a blade mounted on the shaft, an internal gear formed in the upper surface of the cover, an operating handle above the cover, a bearing for said shaft secured to said handle, a pinion on said shaft, an intermediate gear connecting said internal gear and pinion, and a support on said handle for said intermediate gear.

3. In a device of the character described, a jar, a cover therefor, a handle above the cover, a bearing on the handle, a shaft supported in said bearing and extending through the cover, alined gears on the cover and shaft, an intermediate connecting gear carried by the handle, and a blade removably secured to the shaft below said cover.

4. In a device of the character described, a jar, a cover therefor, a shaft extending through said cover and axially arranged with respect to said jar, an operating handle above the cover, a bearing secured thereto and in which said shaft is supported, a blade removably secured to the shaft below the cover, and gear connections for said shaft actuated by said handle.

5. In a device of the character described, a jar, a cover therefor, an internal gear formed in the upper surface of the cover, an operating handle enlarged at its inner end, a bearing mounted at the inner end of the handle, a shaft supported in said bearing, a pinion secured to said shaft, said cover being centrally apertured to receive the lower end of the shaft, an intermediate gear mounted on the enlarged part of said handle and forming a driving connection between said internal gear and pinion, said handle being rotatable with said shaft, and the enlarged part thereof forming a protective covering for the meshing points of said gears, and a blade secured to the lower end of said shaft at a point below said cover.

ALONZO A. WARNER.

Witnesses:
 Oscar A. Marsh,
 O. W. Judd.